United States Patent [19]

Watanabe et al.

[11] Patent Number: 4,720,438

[45] Date of Patent: Jan. 19, 1988

[54] MOLDED CLAY ARTICLE COATED WITH PEARL PIGMENT

[75] Inventors: Takaji Watanabe, Saitama; Katsuhisa Nitta, Fukushima, both of Japan

[73] Assignee: Merck Patent Gesellschaft mit beschrankter Haftung, Darmstadt, Fed. Rep. of Germany

[21] Appl. No.: 873,911

[22] Filed: Jun. 13, 1986

[30] Foreign Application Priority Data

Jun. 13, 1985 [JP] Japan .................................. 60-127259

[51] Int. Cl.$^4$ .............................................. B32B 9/00
[52] U.S. Cl. .................................. 428/697; 427/376.2; 428/702; 428/542.2
[58] Field of Search .................... 427/376.2; 428/542.2, 428/689, 702, 697; 102/291, 308 B

[56] References Cited

U.S. PATENT DOCUMENTS

| | | | |
|---|---|---|---|
| 2,587,152 | 2/1952 | Harlan et al. | 427/376.2 |
| 2,663,658 | 12/1965 | Schurecht | 427/376.2 |
| 3,402,060 | 9/1968 | Groskaufmanis | 427/376.2 |
| 3,510,343 | 5/1970 | Twells | 427/376.2 |
| 3,711,368 | 1/1973 | Brand et al. | 106/291 |
| 3,874,890 | 4/1975 | Bernbard et al. | 106/291 |

*Primary Examiner*—Janyce A. Bell
*Attorney, Agent, or Firm*—Millen & White

[57] ABSTRACT

A process for producing a molded clay article having pearly luster, comprised coating a molded clay article with a mixture of (1) a glaze adjusted to have the sum of the $R_2O$ groups in the Seger formula in the range of 0 to 0.55 mole and (2) a pearlescent pigment comprising mica powder particles having a coating of transparent metal oxide; and firing the coated clay article at a temperature not exceeding 900° C.

17 Claims, No Drawings

MOLDED CLAY ARTICLE COATED WITH PEARL PIGMENT

BACKGROUND OF THE INVENTION

This invention relates to a molded clay article having a coating of pearly luster.

DESCRIPTION OF THE PRIOR ART

Heretofore, molded clay articles such as, for example, tiles produced by using a luster glaze, have been sold in the market. Those articles emit silver colors or rainbow colors by utilizing thin coatings of metal oxides which are applied on the surface of molded clay articles. These molded clay articles can be produced by various methods such as superposing a resin acid salt of a noble metal on a layer of a glaze; reducing a lead glaze containing a coloring oxide in the third round of firing; heating a glaze containing a certain kind of metal oxide to a high temperature and suddenly cooling the hot glaze, thereby permitting formation of particles of the metal oxide; spraying a metal salt solution on a fully fired molded article while hot. These methods, however, pose problems of cost, quality control, and workability because expensive components are used, the number of firing steps is large, and the temperature conditions present during the firing and in the oxidation-reduction atmosphere are difficult to control.

In recent years, a diversification of building styles and designs has create an active demand for molded clay articles with lusters or pearly lusters for the interior and exterior decoration of buildings. Consequently, the difficulties encountered in the manufacture of the molded clay articles using luster glazes have come to attract growing attention.

SUMMARY OF THE INVENTION

Accordingly, it is an object of the invention to develop molded clay articles with pearly lusters which are improvements over the conventional countertypes.

Upon further study of the specification and appended claims, further objects and advantages of this invention will become apparent to those skilled in the art.

In a process aspect, the invention comprises a process for the preparation of a molded clay article having a pearly luster comprising coating it with a specific glaze containing a pearly pigment and firing it at no more than 900° C. For example, the process comprises coating a suitable molded clay article (e.g., first-fired or raw) with a mixture of (1) a glaze adjusted to have the sum of the $R_2O$ groups in the Seger formula in the range of 0 to 0.55 mole and (2) a pearly pigment and firing the resultant coated clay article at a temperature not exceeding 900° C.

In an article aspect, the invention further comprises a molded clay article having a pearly luster which is made by the aforementioned process of preparation. The method for manufacturing the product of this invention excels in operational efficiency, simplicity, and repeatability.

DETAILED DISCUSSION

The first technical characteristic of this invention resides in using a pearly pigment composition instead of forming a coating of metal or metal oxide by the use of a glaze.

Suitable pearly pigment compositions comprise mica powder having a coating of a transparent metal oxide, such as titanium dioxide, deposited on the surface of the mica particles. When the flat particles of this pearly pigment are oriented in a fixed direction, an incident light ray undergoes the phenomena of reflection and refraction on the interface between the metal oxide and the mica in the particles. The refracted light repeats the phenomena of reflection and refraction on the particles positioned at still greater depths. As the result, there is obtained a multi-layer reflection which creates a luster of pearly depth.

The phenomena of reflection and refraction can be controlled by the kind of metal oxide to be used and the thickness of the coating. In the case of titanium dioxide, for example, a pearly luster in a silver color is obtained when the coating has a thickness of 60 $\mu$m. As the thickness is increased, there are eventually obtained colors which result from the interference of the light.

When the coating is made of a colored oxide, such as iron oxide instead of titanium dioxide, there is obtained a pearly luster of an unusual tone because the color inherent in the colored oxide and the pearly luster interfere with each other due to the thickness of the coating. Optionally, a pearly luster pigment combining a coating of titanium dioxide or another suitable metal oxide, and a coating of a colored oxide may be utilized.

Further, the degree of brightness of the luster can be varied by adjusting the grain size of the pigment. A milder pearly luster appears when the grain size is not more than 15 $\mu$m, for example. As the grain size increases, the reflected light increases in intensity and gradually changes from a mild, pearly luster to a metallic luster. For the purpose of the invention, the pigment is suitable in any grain size up to about 150 $\mu$m. Pigments produced as described above are available in the market as agents for imparting pearly lusters to plastics, inks, coating materials, cosmetics, etc.

Suitable commercially available pigments include Afflair® and Iriodin® pigments distributed by EM Industries, Hawthorne, N.Y. and E. Merck, Darmstadt, Germany respectively. Further details regarding the foregoing discussion of pearlescent pigments are conventional and disclosed in many references. See, e.g., U.S. Pat. Nos. 3,087,828, 3,711,308, 3,533,001, 4,038,099, 3,874,890, 4,086,100, 4,456,486, 4,457,784, 4,494,993, 4,509,988 and 4,537,636 which are incorporated by reference herein.

The second technical characteristic of the invention concerns using the pearl pigment described above mixed with a glaze which has a sum of the mole numbers of the $R_2O$ groups in the Seger formula in the range of 0 to 0.55. Owing to the addition of the specific glaze, the coating of the pigment can create a pearly luster on the surface of the molded clay article.

The term "Seger formula" generally means the acid component and the basic component of a given glaze as indicated by the mole numbers of their respective oxides of metal element and non-metal element, as arranged in the three groups of $R_2O+RO$, $R_2O_3$, and $RO_2$, wherein R represents a metal element or non-metal element ("Glazes and Pigments Thereof", pp. 9-25, published by K. K. Gihodo, the disclosure of which is incorporated by reference).

For use in the invention, the glaze is required to be such that the sum of the mole numbers of $R_2O$ groups in the Seger formula will fall in the range of 0 to 0.55, preferably 0.1–0.5. If the sum exceeds 0.55, the pigment, during the course of firing, will melt more than is required into the glaze, thereby impeding the smooth manifestation of the pearly luster and, at the same time, reacting excessively with the underlying clay; possibly to the extent of inducing the drawbacks of penetration and shivering.

The glaze may be present in the form of frit glaze, green glaze or even in the form of a combination of frit and green glaze. Desirably, the glaze is produced by preparing a frit that possesses a suitable ability to retain the luster of a pearl pigment, then admixing this frit with green glaze to form a composition which is suitable for the molded clay article being coated.

The preparation of the frit can be carried out by any of the conventional methods known in the art.

In another embodiment, the glaze may be used in combination with any of the colored pigments generally utilized with glazes. In this case, the colored pigment is preferably added to the glaze while the glaze is being crushed.

As examples of the molded clay article suitable for usage, ceramic white ware, such as table chinas, and ceramic tiles and building materials, such as bricks and block bricks, can be utilized. The composition of a given glaze may be selected to suit products of a particular kind desired to be obtained.

To the colored or uncolored glaze which has been crushed to a desired grain size, the pearly pigment composition is added in an amount not exceeding 33 wt%, preferably in the range of 5 to 20 wt%. If the amount of the added pearly pigment exceeds 30 wt%, the melting point of the resulting mixture will rise and the surface of the fired clay article will become rough.

The stirring of the resultant slurry is carried out in a manner which is incapable of breaking the particles of the pearl pigment. The slurry may incorporate therein an organic or inorganic additive for the purpose of enhancing the adhesive force of the slurry to the underlying clay. Suitable additives are known to the skilled worker and can easily be selected by some experimental testing.

The prepared slurry is applied on the surface of a molded clay article by any of the conventional glazing methods involving a spray, water holes, etc.

The third technical characteristics of this invention involves firing the coated molded clay article at a temperature not in excess of 900° C. Although the firing temperature of the glaze can be freely selected from a fairly wide range, depending on the composition of the glaze, it is desired to operate in the range of about 600° to 900° C. From the standpoint of the strength of the glaze, it is desired that the temperature be as high as possible. However, since the luster of the pearl pigment is lost for good at temperatures exceeding 900° C., the firing temperature must not exceed this value.

The molded clay article coated with the pearl pigment and prepared as described above emits a smooth and clean pearly luster.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the preceding text and the following examples, all temperatures are set forth uncorrected in degrees Celsius and all parts and percentages are by weight; unless otherwise indicated.

EXAMPLE 1

Soda ash, lime, barium carbonate, boric acid, and quartz in such amounts were mixed and fused as to obtain a frit of the following composition by the Seger formula.

| $Na_2O$ | 0.52 | |
|---|---|---|
| $CaO$ | 0.05 | $B_2O_3$ 1.04.$SiO_2$ 1.55 |
| $BaO$ | 0.43 | |

By wet crushing 79.9 parts of this frit in combination with 12.5 parts of kaolin and 6.0 parts of quartz, there was obtained a glaze of the following composition by the Seger formula:

| $(K, Na)_2O$ | 0.52 | |
|---|---|---|
| $CaO$ | 0.05 | $Al_2O_3$ 0.23.$SiO_2$ 2.50.$B_2O_3$ 1.02 |
| $BaO$ | 0.43 | |

A slurry was produced by mixing 90 parts of this glaze with 10 parts of a pigment of silver-color pearly luster having a grain size of about 10 to 50$\mu$ and coated with a titanium dioxide layer about 60 $\mu$m in thickness (produced by Merck Japan and marketed under the trademark designation, "Iriodin 100 Silver Pearl") and adjusting the viscosity of the resultant mixture by the addition of water and a 3% solution of carboxymethyl cellulose (CMC).

This slurry was applied by spraying on an unglazed tile of first-fired clay, and the tile coated with the slurry was fired in an electric oven under an oxidizing atmosphere at a temperature of 700° to 800° C. Consequently, there was obtained a tile coated with a clean, smooth pearl pigment of silver-color pearly luster.

EXAMPLE 2

Soda ash, lime, magnesium carbonate, and minium were mixed and fused as to obtain a frit of the following composition by the Seger formula:

| $Na_2O$ | 0.28 | |
|---|---|---|
| $CaO$ | 0.05 | |
| $MgO$ | 0.23 | $B_2O_3$ 1.04.$SiO_2$ 1.55 |
| $PbO$ | 0.43 | |

By wet crushing 90 parts of this frit with 10 parts of a pigment of silver-color pearly luster having a grain size of about 10 to 50$\mu$ and coated with a rutile type titanium dioxide layer about 60 $\mu$m in thickness (produced by Merck Japan and marketed under the trademark designation of "Iriodin 101 Rutile Silver") and adjusting the viscosity of the resultant mixture by addition of water and a 3% solution of CMC.

This slurry was applied by spraying on an unglazed tile of first-fired clay and the unglazed tile coated with the slurry was fired in an electric oven under an oxidizing atmosphere at a temperature in the range of 650° to 700° C. Consequently, there was obtained a tile coated with a clean, smooth pearl pigment of silver-color pearly luster.

EXAMPLE 3

Minium, quartz, borax, feldspar, limestone, and kaolin were mixed and fused as to obtain a frit having the following composition by the Seger formula:

| | | |
|---|---|---|
| (K, Na)₂O | 0.24 | |
| CaO | 0.24 | Al$_2$O$_3$ 0.14.SiO$_2$ 1.99.B$_2$O$_3$ 0.32 |
| PbO | 0.52 | |

A slurry was obtained by wet crushing 95 parts of this frit with 5 parts of a pigment of silver-color scintillant pearly luster having a grain size of about 15 to 130μ and coated with a titanium dioxide layer about 60 mμ in thickness (product of Merck Japan and marketed under trademark designation, "Iriodin 130 Glitter Pearl") and adjusting the viscosity of the resultant mixture by addition of water and a 3% aqueous solution of CMC.

This slurry was applied by spraying on an unglazed tile of first-fired clay and the unglazed tile coated with the slurry was fired in an electric oven under an oxidizing atmosphere at a temperature in the range of 700° to 750° C. Consequently, there was obtained a tile coated with a clean pearl pigment of scintillant silver-color pearly luster.

EXAMPLE 4

Soda ash, lime, barium carbonate, magnesium carbonate, zinc oxide, boric acid, quartz, and kaolin were mixed and fused to produce a frit having the following composition by the Seger formula:

| | | |
|---|---|---|
| Na$_2$O | 0.19 | |
| CaO | 0.05 | |
| MgO | 0.24 | Al$_2$O$_3$ 0.09.SiO$_2$ 1.78.B$_2$O$_3$ 1.06 |
| ZnO | 0.74 | |
| BaO | 0.44 | |

A slurry was obtained by mixing 100 parts of this frit with 10 parts of the same pearly pigment as used in Example 2 and then adjusting the viscosity of the resultant mixture by addition of water and an aqueous 3% CMC solution.

This slurry was applied by spraying on an unglazed tile of the first-fired clay and the unglazed tile coated with the slurry was fired in an electric oven under an oxidizing atmosphere a temperature in the range of 850° to 900° C. Consequently, there was obtained a tile coated with a clean, smooth pearl pigment of silver-color pearly luster.

EXAMPLES 5–8

By wet crushing 90 parts each of a frit prepared by following the procedure of Example 1 in each case with the pigments described in (5), (6), (7), and (8) below:
(5) 10 parts of a pigment of a blue interference color having a grain size of about 10 to 50 u and coated with a titanium dioxide layer about 140 mu in thickness (produced by Merck Japan and marketed under trademark designation "Iriodin 220 Blue Pearl"),
(6) 10 parts of a pigment of silver interference color and yellow background color having a grain size of about 10 to 50μ and coated with a titanium dioxide and iron oxide layer about 90 mμ in thickness (produced by Merck Japan and marketed under the trademark designation "Iriodin 300 Gold Pearl"),
(7) 10 parts of a pigment of a red interference color and iron oxide background color having a grain size of about 10 to 50μ and coated with iron oxide layer about 72 mμ in thickness (produced by Merck Japan and marketed under the trademark designation "Iriodin 504 Rot"), and
(8) 10 parts of a pigment of moderate silver-color pearly luster having a grain size of about 2 to 15μ and coated with titanium dioxide layer about 60 mμ in thickness (produced by Merck Japan and marketed under the trademark designation "Iriodin 110 Fine Satin"), after applying each of the resultant slurries on a separate unglazed tile of first-fired clay and firing the coated unglazed tiles by following the procedure of Example 1, there were obtained the following products:
(5) a tile coated with a clear pearl pigment of blue interference color,
(6) a tile coated with a clear pearl pigment of golden pearly luster,
(7) a tile coated with a clear pearl pigment of red interference color and iron oxide background color, and
(8) a tile coated with a clear pigment of moderate silver color.

EXAMPLE 9

A frit was prepared and then wet crushed by following the procedure of Example 1. A slurry was obtained by mixing 99 parts of the resultant slurry with 1 part of the same pearl pigment as used in Example 2 and adjusting the viscosity of the resultant mixture by addition of water and an aqueous 3% CMC solution.

The slurry was applied by spraying on an unglazed tile of first-fired clay and the coated unglazed tile was fired in an electric over under an oxidizing atmosphere at a temperature in the range of 610° to 660° C. Consequently, there was obtained a tile coated with a clear, mold pearl pigment of silver-color pearly luster.

EXAMPLE 10

Minium and quartz were mixed and fused to produce a frit of the composition, PbO 1.00.SiO$_2$ 1.01 by the Seger formula. By mixing 3 parts of this frit with 7 parts of the same frit as prepared in Example 2, there was obtained a frit mixture of the following composition of the Seger formula:

| | | |
|---|---|---|
| Na$_2$O | 0.18 | |
| CaO | 0.03 | |
| MgO | 0.15 | B$_2$O$_3$ 0.67.SiO$_2$ 1.36 |
| PbO | 0.63 | |

By wet crushing this frit mixture, a mixed slurry was obtained. This slurry was mixed with the same pearl pigment of silver-color scintillant pearly luster used in Example 3 in a ratio of 5 parts of the pearl pigment to 10 parts of the frit in the slurry. Then, by adjusting the viscosity of the resultant mixture by addition of water and an aqueous 3% CMC solution, there was obtained a mixed slurry.

This slurry was applied by spraying on an unglazed tile of first-fired clay and the coated, unglazed tile was fired in an electric oven under an oxidizing atmosphere at a temperature in the range of 710° to 760° C. Consequently, there was obtained a tile coated with a pearl pigment of scintillant silver-color pearly luster, although the surface of the pearl pigment was rough with visible irregularities.

EXAMPLE 11

A colored frit slurry was obtained by wet crushing 80 parts of the same frit as prepared in Example 1, in combination with 5 parts of a blue pigment generally used as a pigment in glazes. By mixing this colored frit slurry with the same pearl pigment as used in Example 1, in a ratio of 10 parts of the pearl pigment to 80 parts of the frit in the slurry and then adjusting the viscosity of the resultant mixture by addition of water and an aqueous 3% CMC solution, there was obtained a mixed slurry.

This slurry was applied by spraying on an unglazed tile of first-fired clay and the coated unglazed tile was fired in an electric oven under an oxidizing atmosphere at a temperature in the range of 670° to 720° C. Consequently, there was obtained a tile coated with a pearl pigment emitting a silver-color smooth pearly luster from a blue background color.

EXAMPLE 12

A mixed slurry of frit, raw components, and pearl pigment prepared by the procedure of Example 1 was applied by spraying on one surface of an unglazed brick of green clay. The coated unglazed brick was fired in an electric oven under an oxidizing atmosphere at a temperature in the range of 750° to 800° C. Consequently, there was obtained a brick coated with a clean, smooth pearl pigment of silver color.

EXAMPLE 13

Soda ash, lime, minium, boric acid, and silica sand of Hinooka origin were mixed and fused as to produce a frit of the following composition by the Seger formula:

| $Na_2O$ | 0.50 | |
|---|---|---|
| CaO | 0.09 | } $B_2O_3$ 1.00.$SiO_2$ 1.50 |
| PbO | 0.41 | |

This frit was wet crushed and then mixed with the same pearl pigment as used in Example 2, in a ratio of 10 parts of the pearl pigment to 90 parts of the frit. Then, by adjusting the viscosity of the resultant mixture by addition of water and an aqueous 3% CMC solution, there was obtained a mixed slurry.

This slurry was applied by brushing on a tea cup of first-fired unglazed clay and the coated unglazed tea cup was fired in an electric oven under an oxidizing atmosphere at a temperature of 560° to 610° C. Consequently, there was obtained a tea cup coated with a clean, smooth pearl pigment of silver-color pearly luster.

COMPARATIVE EXPERIMENT 1

Soda ash, minium, boric acid, and quartz were mixed and fused so as to produce a frit of the following composition by the Seger formula:

| $Na_2O$ | 0.58 | } $B_2O_3$ 1.05.$SiO_2$ 1.57 |
|---|---|---|
| PbO | 0.42 | |

This frit was wet crushed and then mixed with the same pearl pigment as used in Example 2, in a ratio of 5 parts of the pearl pigment to 95 parts of the frit. Then, by adjusting the viscosity of the resultant mixture by addition of water and an aqueous 3% CMC solution, there was obtained a mixed slurry.

This slurry was applied by spraying on an unglazed tile of first-fired clay and the coated unglazed tile was fired in an electric oven under an oxidizing atmosphere at a temperature in the range of 620° to 670° C. As a consequence of this firing, the glaze turned yellow and failed to produce pearly luster. Under a microscope, the fired glaze was found to have lost the pearl pigment.

COMPARATIVE EXPERIMENT 2

This experiment represents a case of conducting the firing at a temperature of 920° C.

Minium and quartz in such amounts were mixed and fused as to produce a frit of the composition by the Seger formula; PbO 1.00.$SiO_2$ 1.01.

Minium, soda ash, lime, magnesium, carbonate, boric acid, and quartz were mixed and fused as to produce a frit of the following composition by the Seger formula:

| $Na_2O$ | 0.05 | |
|---|---|---|
| CaO | 0.05 | } $B_2O_3$ 1.04.$SiO_2$ 1.55 |
| MgO | 0.47 | |
| PbO | 0.43 | |

Soda ash, lime, barium carbonate, boric acid, and quartz were mixed and fused in such amounts as to produce a frit of the following composition by the Seger formula:

| $Na_2O$ | 0.52 | |
|---|---|---|
| CaO | 0.05 | } $B_2O_3$ 1.04.$SiO_2$ 1.55 |
| BaO | 0.43 | |

These three frits were mixed in a weight ratio of 1:1:1. By wet crushing 60 parts by weight of the resultant mixture with 12 parts of kaolin and 28 parts of quartz, there was obtained a glaze of the following composition by the Seger formula:

| $Na_2O$ | 0.17 | |
|---|---|---|
| CaO | 0.03 | |
| MgO | 0.14 | } $Al_2O_3$ 0.265.$B_2O_3$ 0.63.$SiO_2$ 4.48 |
| BaO | 0.13 | |
| PbO | 0.52 | |

By mixing 90 parts of this glaze with 10 parts of the same pearl pigment as used in Example 2 and adjusting the viscosity of the resultant mixture by addition of water and an aqueous 3% CMC, there was obtained a mixed slurry.

This slurry was applied by brushing on an unglazed tile of first-fired clay. The coated unglazed tile was fired in an electric oven under an oxidizing atmosphere at a temperature in the range of 900° to 950° C. In this case, the glaze failed to acquire pearly luster. Under a microscope, the glaze was found to have lost the pearl pigment.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for producing a molded clay article having pearly luster, comprising coating a molded clay article with a mixture of (1) a glaze adjusted to have the sum of the $R_2O$ groups in the Seger formula in the range of 0 to 0.55 mol and (2) a pearlescent pigment comprising mica powder particles having a coating of transparent metal oxide wherein the pearl pigment is present in an amount up to about 33 wt% of the glaze composition; and firing the coated clay article at a temperature not exceeding 900° C.

2. A process according to claim 1, wherein the pearly pigment comprises mica platelets each having a surface coating of titanium dioxide.

3. A process according to claim 1, wherein the grain size of the pearly pigment ranges from about 15 to 150 μm.

4. A process according to claim 2, wherein the pearly pigment is coated with titanium dioxide and a coating of a colored oxide.

5. A process according to claim 1, wherein the glaze is present as frit glaze, mint green glaze, or mixtures thereof.

6. A process according to claim 1, wherein the pearl pigment is present in the range of 5–20%.

7. A process according to claim 1, wherein the firing temperature ranges from about 600° to 900° C.

8. A process according to claim 1, wherein the $R_2O$ oxides in the Seger formula are $Na_2O$, $K_2O$ or both.

9. A process of claim 1, wherein the molded clay article has been pre-fired.

10. A process of claim 1, wherein the molded clay article is raw.

11. A molded clay article having pearly luster, made by the process of claim 1.

12. A molded clay article having pearly luster, made by the process of claim 2.

13. A molded clay article having pearly luster, made by the process of claim 4.

14. A molded clay article having pearly luster, made by the process of claim 5.

15. A molded clay article having pearly luster, made by the process of claim 6.

16. A molded clay article having pearly luster, made by the process of claim 7.

17. A molded clay article having pearly luster, made by the process of claim 8.

* * * * *